US006263837B1

(12) United States Patent
Utunen et al.

(10) Patent No.: US 6,263,837 B1
(45) Date of Patent: Jul. 24, 2001

(54) GRATE CONSTRUCTION OF A FLUIDIZED BED BOILER

(75) Inventors: Pekka Utunen, Turku; Pekka Lehtonen, Karhula, both of (FI)

(73) Assignee: Foster Wheeler Energia Oy, Helsinki (FI)

( * ) Notice: Subject to any disclaimer, the term of this patent is extended or adjusted under 35 U.S.C. 154(b) by 0 days.

(21) Appl. No.: 09/508,284

(22) Filed: Mar. 9, 2000

(30) Foreign Application Priority Data

Sep. 12, 1997 (FI) ........................................................ 973668

(51) Int. Cl.$^7$ ........................................................ B09B 8/00
(52) U.S. Cl. ............................ 122/4 D; 110/245; 432/58
(58) Field of Search .......................... 122/4 D; 110/245; 432/58, 15

(56) References Cited

U.S. PATENT DOCUMENTS

| 4,211,186 | 7/1980 | Pearce | 122/4 D |
| 4,263,877 | 4/1981 | Urquhart | 122/4 D |
| 4,372,228 | 2/1983 | Korenberg | 110/347 |
| 4,382,415 | * 5/1983 | Korenberg | 110/245 |
| 4,757,771 | 7/1988 | Narisoko et al. | 110/245 |
| 4,854,854 | 8/1989 | Jonsson | 431/170 |
| 5,176,089 | 1/1993 | Jonsson | 110/245 |
| 5,395,596 | 3/1995 | Winkin et al. | 422/142 |
| 5,743,197 | 4/1998 | Kinni et al. | 110/245 |

FOREIGN PATENT DOCUMENTS

| 0 289 974 | 9/1988 | (EP) . |
| 462 445 | 6/1990 | (SE) . |
| 462 995 | 9/1990 | (SE) . |

* cited by examiner

*Primary Examiner*—Jiping Lu
(74) *Attorney, Agent, or Firm*—Fitzpatrick, Cella, Harper & Scinto (57) ABSTRACT

A grate construction for a fluidized bed boiler, the boiler including a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate. The grate construction includes a device for distributing fluidizing air or other equivalent gas from the windbox into the furnace and a device for removing coarse solids from the grate construction. The device for removing coarse solids includes a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering inwardly.

27 Claims, 7 Drawing Sheets

GRATE CONSTRUCTION OF A FLUIDIZED BED BOILER

The present invention relates to a grate construction of a fluidized bed boiler, like a fluidized bed combustor.

Fluidized bed boilers mainly comprise a furnace defined by vertical walls, in which a fluidized bed of solid particles is maintained; a windbox in the lower part of the boiler under the furnace; and a grate mounted between the furnace and the windbox for supporting the fluidized bed in the furnace. In the grate there, are typically means, such as nozzles, for distributing fluidizing air and/or some other gas into the furnace from the windbox. Additionally, means for removing coarse solids, such as bed material, ash or the like from the grate are conventionally connected to the grate. A solids outlet duct is furthermore provided at the bottom of the boiler for withdrawing from the boiler solids removed from the grate.

Thus, the present invention especially relates to the means of the grate construction for withdrawing from the boiler bottom coarse material generated during the fluidized bed combustion.

In a fluidized bed boiler, coarse material will accumulate on the bottom of the furnace, i.e., on the grate when combustibles rich in non-combustibles, such as stones or scrap iron, are used in fluidized bed combustion, or when the combustion process itself produces coarse non-combustibles, e.g., when the ashes agglomerate. The non-combustibles accumulating on the grate should be removed before interacting detrimentally with the operation of the fluidized bed, e.g., by preventing appropriate distribution of fluidizing and combustion air into the furnace. Effective apparatuses are required for the discharge of the coarse material.

Thus, an ash outlet channel or several conventional ash outlet pipes placed at the bottom of a furnace are often not sufficient to effectively remove coarse material, as fluidizing air is not capable of transferring heavy or unfavorably shaped pieces horizontally for long distances. The migration of material along the furnace bottom is especially hampered when the bottom has upwards projecting air nozzles or other irregularities, to which the coarse material might stick.

An attempt to improve the removal of material from the bottom of a fluidized bed is to use directional fluidizing air nozzles which, by blowing, guide the material towards the outlet opening or duct, as disclosed, e.g., U.S. Pat. No. 5,395,596. The bottom could be stepped or slanted downwards towards the outlet, whereby the gravitation assists the horizontal migration of the material. Such solutions have been presented, for example, in the U.S. Pat. No. 4,372,228. The problem with these solutions may, however, be abrasion of the nozzles and their vicinity, caused by the moving material and the transport air fed at a high velocity. It is also difficult to ensure an even air feed over the entire grate area due to the different bed pressures at various nozzles, at least when the bottom has great level differences.

In another proposed method for the discharge of ashes, the furnace bottom is made of hoppers directing non-combustibles from the entire furnace area into common pits for withdrawing the ashes. Here, the furnace grate is made of separate air feed pipes placed above the ash hoppers. Such solutions have been disclosed, e.g., in U.S. Pat. No. 4,757,771 and European patent application No. 289,974. A problem of these solutions is ensuring the working reliability of the separate air feed pipes extending across the boiler. The separate air feed pipes also create pressure losses leading to pressure loss differences between the nozzles along the air feed pipe. Compensation of the pressure loss differences, which depend upon any given location of assembly, by means of the pressure losses of the nozzles, does not work but for a given feed rate of the fluidizing air. Air nozzles, having so great of pressure losses that the effect of the pressure losses of the air feed pipes remains negligible, have therefore been utilized. However, then the total pressure losses and the costs caused by them will become high.

An inconvenience, when using air feed pipes, still to be mentioned is that only such nozzles can be used as air feed pipes wherein counterflow access of the material into the nozzles is prevented, because even a relatively small quantity of material in the air feed pipes might at least partially clog the pipes and further increase the pressure losses therein.

When the grate is made of ash hoppers together essentially covering the entire bottom of the furnace, the problem will also be that the hoppers will, during operation, contain a great quantity of material. As the material content of the hoppers is not fluidized, a substantial amount of uncombusted fuel or other material useful in the combustion process may be removed therewith. The great mass of material accumulating in the hoppers sets requirements on the strength of the hopper construction.

The U.S. Pat. No. 4,263,877 describes among others a construction in which the furnace bottom is made of several windboxes having a slanted upper part. Vertical air nozzles project from the slanted bottom of the furnace and their upper parts are arranged to extend to the same level. Attempts have been made to solve part of the aforementioned problems of this solution, but still the coarse material, such as scrap iron or the like entering the furnace with the fuel, flowing along the slanted furnace bottom, may easily get caught in the long nozzles projecting upwards from the bottom, which nozzles the material has to confront when flowing towards the ash outlet pipe or pipes which have been arranged at a relatively long distance apart.

It is realized from the above description of the prior art that there is a need for new constructions by which coarse ash and other non-combustibles can, efficiently and without deleteriously affecting the operation of the boiler, be transported to ash withdrawal from the entire furnace bottom area.

An object of the present invention is thus to provide an improved grate construction wherein the drawbacks mentioned above have been minimized.

A special object of the present invention is to provide a grate construction with improved coarse ash discharge in which the construction of the means for ash discharge is durable, the load thereon minimized, and wherein unnecessary withdrawal of useful material from the grate has been minimized.

Then, an object of the present invention is also to provide a grate construction, in which the sticking of the material to be removed to the fluidizing air nozzles has been minimized.

A further object of the present invention is to provide a grate construction for avoiding excessive pressure losses in the air feed and air feeding problems caused by pressure differences, and which provides a reliably operating air feed.

Yet another object of the present invention is to provide a grate construction, in which the factors that deleteriously affect the durability of the air feed pipes and the nozzles therebetween have been minimized.

In order to achieve the above-mentioned objects, the present invention provides a grate construction as defined in claim 1.

The grate according to the invention typically comprises several substantially vertical pockets opening into the furnace and projecting from the grate into the windbox and connected through their bottoms to the outlet channel of the solids for removing coarse bed material from the grate. In a typical grate construction of the invention, the furnace grate of the fluidized bed boiler, i.e., the upper surface of the windbox at the furnace bottom, is thus designed so that the grate will be divided, on one hand, into substantially horizontal primary air feed zones, in which the main part of the air nozzles are and, on the other hand, into ash discharge zones comprising partly vertical and partly downwards inclined surfaces along which the coarse material to be withdrawn runs into one or more ash discharge ducts or shafts.

The pockets beneath the grate are typically formed of two long, parallelly extending vertical walls which are slightly apart from each other, and at least one transverse wall connecting said long walls, the transverse wall being inclined. At the grate level, the horizontal cross section of the pockets has the form of a slit so that the length $p_t$ at the grate level is typically at least twice its width $l_t$. Due to the inclination of the transverse walls, the length of the pockets decreases downwards so that the slanting wall may be considered forming also the bottom for the pocket.

According to a typical embodiment of the invention, each pocket is preferably designed so that the longitudinal walls are connected by two slanting, transverse walls so that the vertical cross section of the pockets so formed, in direction of the slits, tapers downwards like a hopper. The angle α of inclination of the slanted transverse wall is preferably at least 15°. If the angle of inclination can be made greater than the angle of repose of the solids, then it is easy to make the solids flow by themselves to the bottom of the pocket. In other cases, the downward flow can be enhanced by blowing in manners known per se.

The pockets are preferably parallel and arranged in the grate apart from each other so that the pockets divide the grate into grate zones or sections forming the primary air feed zones of the grate and having fluidizing air nozzles for feeding fluidizing air into the furnace. The fluidizing air nozzles are connected to a windbox below the grate. The windbox is preferably one compact box covering the entire underside of the grate. The windbox may, if so needed, be divided into parts and the nozzle groups at different areas of the grate connected to the various parts of the windbox.

The pockets advantageously divide the grate into zones or sections having a width $l_a$, i.e., the grate part remaining between the pockets is at least equal to the width $l_t$ of the pockets, that is, at least equal to the distance between the longitudinal walls of the pockets. The width $l_a$ of the pockets is typically equal to or greater than 10 cm. Typically $l_a$ is between 1–20×$l_t$, preferably between 2–10×$l_t$.

In a typical grate construction according to the invention, the surface area of the horizontal air feed areas is more than half of the entire bottom area of the furnace, but with different fuels the optimal proportion of the air feed area of the bottom surface area may vary between up to 50–95%. When the horizontal mobility of the material on the grate is good, a great part, i.e., typically 70–95% of the bottom surface area can be utilized as air feed areas. Then, the pocket openings will cover 30–50%, respectively of the bottom surface area of the grate. When using fuel which results in a great quantity of poorly mobile material, the proportion of the air feed areas is typically about 50–70% of the bottom surface area.

If the mobility of the material to be withdrawn is poor, then the air feed areas have to be designed such that there is a very short distance from every point of the bottom supporting the fluidized bed to the nearest pocket opening, that is the nearest ash discharge area. This is accomplished by dividing the furnace bottom, i.e., grate into alternating air feed and ash discharge zones, in which grate the air feed zones are so narrow that one can assume that the material will certainly migrate therefrom to the ash discharge areas by means of the fluidizing air. The air feed zones could in fact be so narrow that only one longitudinal row of air feed nozzles is mounted on a zone. This means that coarse particles to be removed from the grate, i.e., zone, on their way towards the nearest ash discharge zone, never have to pass by an air nozzle, and thus sticking to the nozzle is highly improbable.

The mobility of the material in the air feed areas may, whenever needed, be enhanced by designing also the upper surface of the air feed areas, i.e., grate zones slightly inclined towards the nearest ash discharge area or slit and/or by using directional air feed nozzles.

According to a preferred embodiment of the invention, the long walls of the pockets are made of a cooled panel extending from a first wall of the windbox to substantially the opposite second wall, which panel is typically of a construction similar to that of the cooled walls of the furnace. In this case, the first panel-connecting, transverse wall of the pocket can be arranged to extend essentially from the top part of the first wall, defining the windbox, with a downward inclination towards the center part of the windbox, and the second panel-connecting, transverse wall can be arranged to extend from the upper part of the opposite second wall, defining the windbox, with a downward inclination towards the center part of the windbox, i.e., towards said first transverse wall so that the transverse walls form a hopper-like pocket between the cooled panels.

The above mentioned embodiment of the invention is especially adapted for use in boilers, in which also the grate is made of a planar, substantially horizontal cooling plane made of cooling tubes, and wherein at least part of the transverse walls of the pockets may be formed of cooling tubes bent downwards from the cooling plane into the windbox.

In the windbox there may be, when so desired, between the first and second cooled panels, two or more narrow, consecutive pockets, whereby a third transverse wall, which extends downwards from the grate, is in addition to the first and second transverse walls positioned between the panels, and forming together with the first transverse wall a downwards hopper-like tapering pocket, and a fourth transverse wall, which together with the second transverse wall, forms a downwards hopper-like tapering pocket. Even more pockets can be formed between the cooled panels by increasing the number of transverse walls. It is evident that pockets can, by the same principle, be formed between non-cooled, e.g., refractory lined, longitudinal walls.

According to a preferred embodiment of the invention, the pockets may be inclined downwards at their first transverse side and open at their second transverse side. Then, the open side of the pockets will preferably open into a collecting or outlet duct for solids transverse to the pockets of the windbox whereby the material, flowing into the pockets and along the first side of the pocket and the bottom, is discharged from the pocket through the second open side into said collecting duct.

It is essential according to the invention that at least a major part of the fluidizing air nozzles is immediately at the upper surface of the windbox in grate zones/areas, forming the upper surface of the windbox, in the form of essentially horizontal or longitudinal ridges. Thus, the invention enables obtaining relatively low pressure losses as the fluidizing air may be fed to the nozzles directly from the windbox without any separate air feed pipes. When feeding air from a windbox the pressure loss is even over the entire grate area, so it is not necessary to control the nozzles in order to level out the pressure loss. Neither will a small backflow of ash to the windbox via the nozzles cause any increase in the pressure loss, as a backflow into the air feed pipes could do by partially clogging the pipes being narrow in themselves. In this way, the causes leading to said uneven pressure loss are avoided by the solution of the invention and the fluidizing air can be evenly distributed in a simple manner over the whole grate area.

Another advantage of the invention worth mentioning, compared to grate constructions made of air feed pipes, is that since the feed areas of fluidized air provided with nozzles in the construction of the invention are parts directly and fixedly attached to the upper part of the windbox, these areas are sturdy and no special support constructions are required.

An advantage of the present invention is also that, although ash discharge with this solution operates effectively over the whole bottom area, the ash collecting space, i.e., the narrow hoppers, corresponding to the ash hoppers of the prior art and formed at the ash discharge areas, fill only a small portion of the lower part of the furnace. Thus, the amount of unfluidized material remaining on the ash collecting area under the air feed plane, is small and the risk of premature withdrawal of useful, fine, combustible material is small. The load exerted upon the furnace bottom is furthermore relatively low.

The invention will be described in more detail below with reference to the appended drawings, in which FIG. 1 schematically illustrates a vertical cross section of the lower part of a furnace of a fluidized bed boiler having a grate construction according to the invention.

Figure 1:
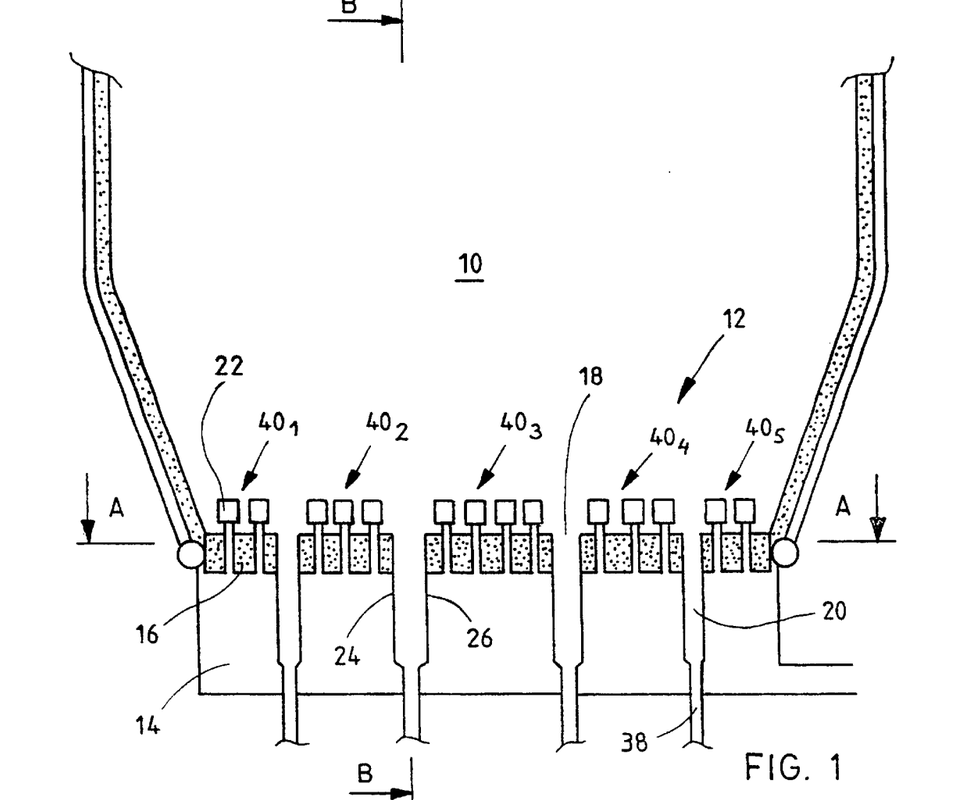
Figure 2:
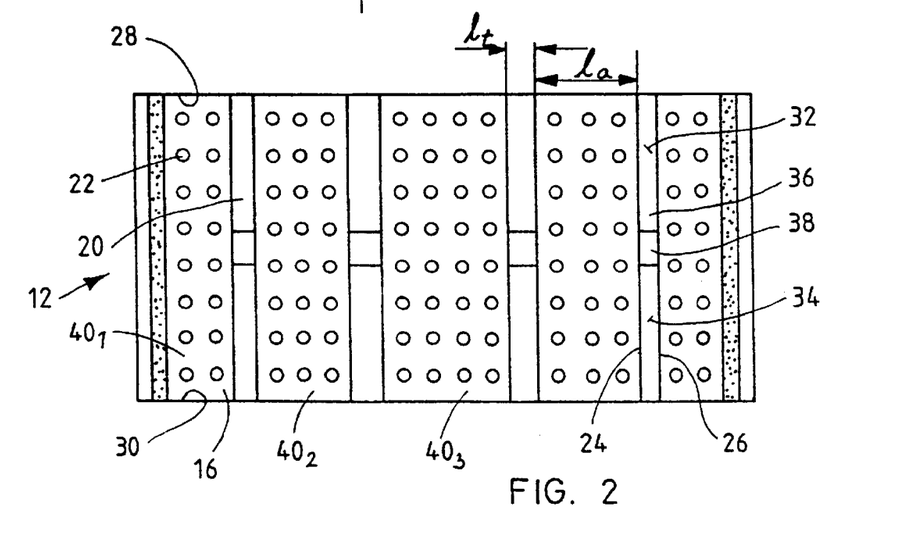
FIG. 2 shows a horizontal section taken along line AA in FIG. 1.
Figure 3:
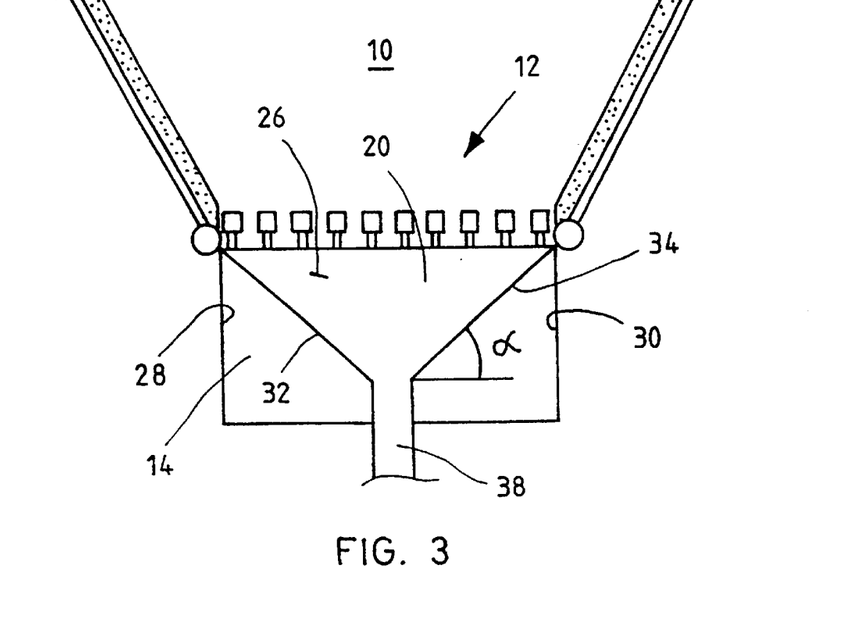
FIG. 3 shows the lower part of the furnace of FIG. 1 along line BB.

A lower part 10 of a furnace of a fluidized bed boiler is illustrated in FIGS. 1, 2 and 3, wherein the grate 12 of the invention is placed between the lower part of the furnace and the windbox 14. In the furnace a fluidized bed of solid particles is maintained. The grate 12 comprises a planar grate plate 16 having openings 18 to which pockets 20 extending downwards into the windbox 14, have been connected. The pockets 20 operate as collecting spaces for coarse ash material and other non-combustible material. The grate plate 16 is provided with nozzles 22 distributing fluidizing or combustion air from the windbox 14 above the grate plate 16 in the furnace.

The pockets 20 connected to the grate are made of two parallel, longitudinal, vertical walls 24 and 26 attached at their top edges to the grate and extending at their top parts from the first wall 28 of the windbox 14 to its second, opposite wall 30. The transverse, narrow sides of the pockets are transverse, inclined walls 32, 34 fixed to the grate and connecting the long walls 24, 26, said inclined walls slanting downwards, the first from the first wall 28 and the second from the second wall 30 towards the center of the windbox.

The top edges of the pocket walls 24, 26, 32, 34 form, in the top part of the grate, a slit 36, the horizontal cross section of which is longitudinal and which forms an inlet opening 18 to the pocket. According to the sectional view in accordance with FIG. 1, the pockets as a whole are of the form of a narrow slit as for their vertical cross sections parallel to the walls 28 and 30, as can be seen in FIG. 1. The openings to the pockets cover, according to the invention, typically <50% of the grate cross section and the length of their horizontal cross section at the grate level is at least twice the width of the cross section.

The horizontal slit-like cross-sectional area of the pocket, however, decreases downwards due to the transverse inclined walls 32, 34. Thus, the vertical cross section of the pocket perpendicular to the walls 28, 30 has the form of a hopper, as seen from FIG. 3.

The bottoms of the pockets 20 are connected to outlet ducts 38 for solids. The outlet ducts 38 can, on the other hand, in some conventional manner be connected to a common outlet pipe, although not shown in the Figures.

It is apparent from FIGS. 1 and 2 how the grate construction of the present invention is divided into separate zones or sections $40_1$, $40_2$, $40_3$, $40_4$, $40_5$. The nozzles 22 in the separate grate zones are all communicating with a common windbox 14. FIGS. 1 and 3 clearly show that the construction of the windbox is continuous below the pockets.

The width $l_a$ of the grate zones $40_1$, $40_2$, $40_3$, $40_4$, $40_5$ provided with nozzles is, in the embodiment of FIGS. 1–3, remarkably greater than the width $l_r$ of the pocket inlets, the width $l_a$ being about 3–4 times the level $l_r$. The grate zones 40 depicted in FIG. 1 are planar on their upper surfaces. If so desired, they can be made as concave ridges, if the flow of the coarse material so requires.

The pocket construction of the invention is, as apparent from the Figures, very rigid as supported by the furnace, grate and windbox constructions. The pockets of the invention may, however, as evident from the Figures, be relatively narrow, especially compared with known ash discharge hoppers covering the entire cross-sectional area of the furnace. The mass of material to be discharged loading the pockets of the invention and thus also the need of support is less than in known grates provided with larger hoppers.

Figure 4:
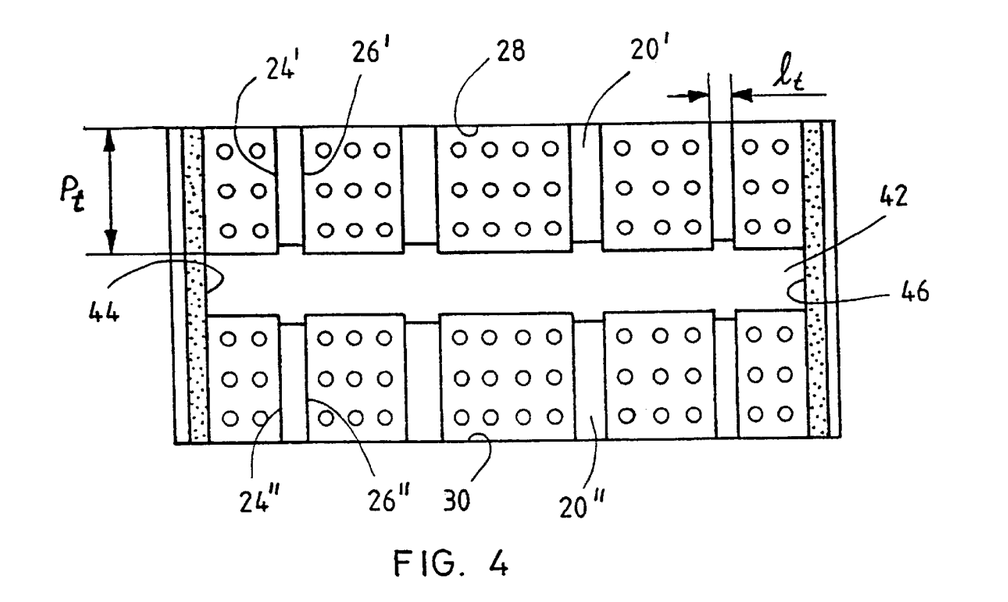
FIG. 4 schematically illustrates another embodiment of the grate construction of the invention as in FIG. 2.
Figure 5:
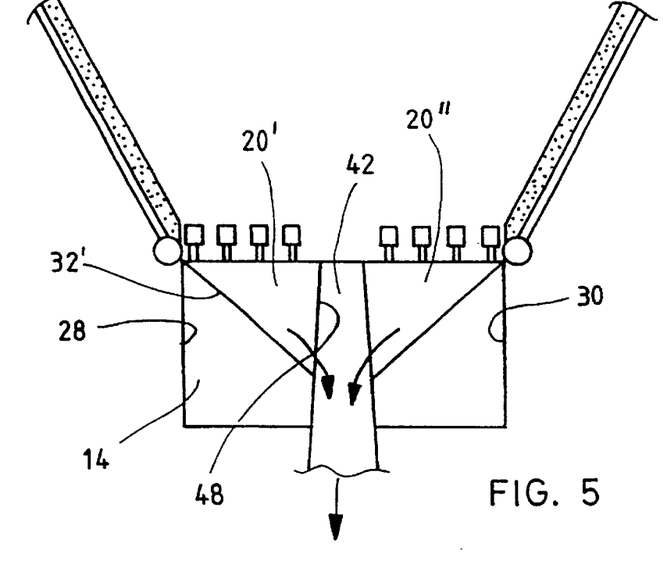
FIG. 5 illustrates the grate construction of FIG. 4 mounted in the lower part of a furnace as in FIG. 3.

FIGS. 4 and 5 depict another, alternative grate construction embodiment according to the invention. When appropriate, the same reference numbers have been used as in FIGS. 1–3. A collecting duct or chute 42 for the coarse material, common for and transverse to the pockets, has in addition to the transverse pockets 20, been connected to the grate construction of FIGS. 4–5. The collecting duct 42 is arranged to extend across the windbox, from the third wall 44 thereof to the opposite fourth wall 46 dividing the windbox into two parts. At the same time, the collecting duct 42 divides the pockets 20 of the windbox 14 extending from wall 28 to wall 30 at the grate level, into two parts 20' and

20″. The pocket parts 20′ and 20″ are substantially mirror images of each other and their vertical cross section has the form of right-angled triangles, as evident from FIG. 5, one side of the triangle being parallel with the grate, the second side being essentially perpendicular to the grate and the third side is inclined. The pocket parts are defined at three sides by walls, longitudinal walls 24′, 26′ and an inclined, transverse side wall 32′. One side 48 of the pockets is open so that ash or like, flowing from the grate of the pocket, can freely flow from the pocket into the collecting duct 42, as indicated by the arrows in FIG. 5.

The grate construction of FIGS. 4 and 5 may, of course, whenever needed, be modified so that instead of one long collecting duct 42 several collecting ducts are used, which may be arranged mutually parallel or transverse. The pockets themselves may also be designed so that they are mutually transverse.

Figure 6:
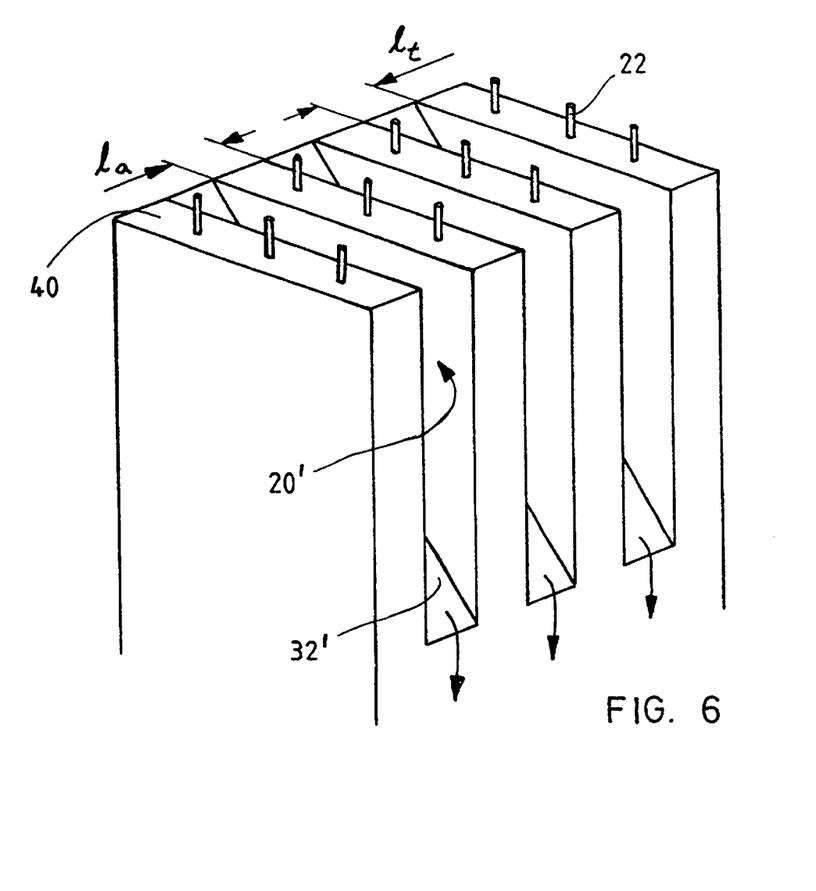
FIG. 6 axonometrically illustrates a part of the grate construction illustrated in FIGS. 4 and 5.

FIG. 6 illustrates a part of a grate construction according to the invention, which is essentially similar to the solution shown in FIGS. 4–5, except that the grate zones 40 are very narrow in FIG. 6. In the grate zone only one row of nozzles 22 has been formed longitudinally thereto. In FIG. 6 the widths $l_a$ of the grate zones 40 are substantially of the magnitude of the pocket widths $l_t$. The nozzles 22 of the different grate zones have, however, on the same side of the collecting channel also in the case of FIG. 6, been connected to the same windbox. A big windbox may, of course, if so wished, be divided into smaller units or the windbox parts on both sides of the collecting duct connected under the collecting duct into a common air space.

Figure 7:
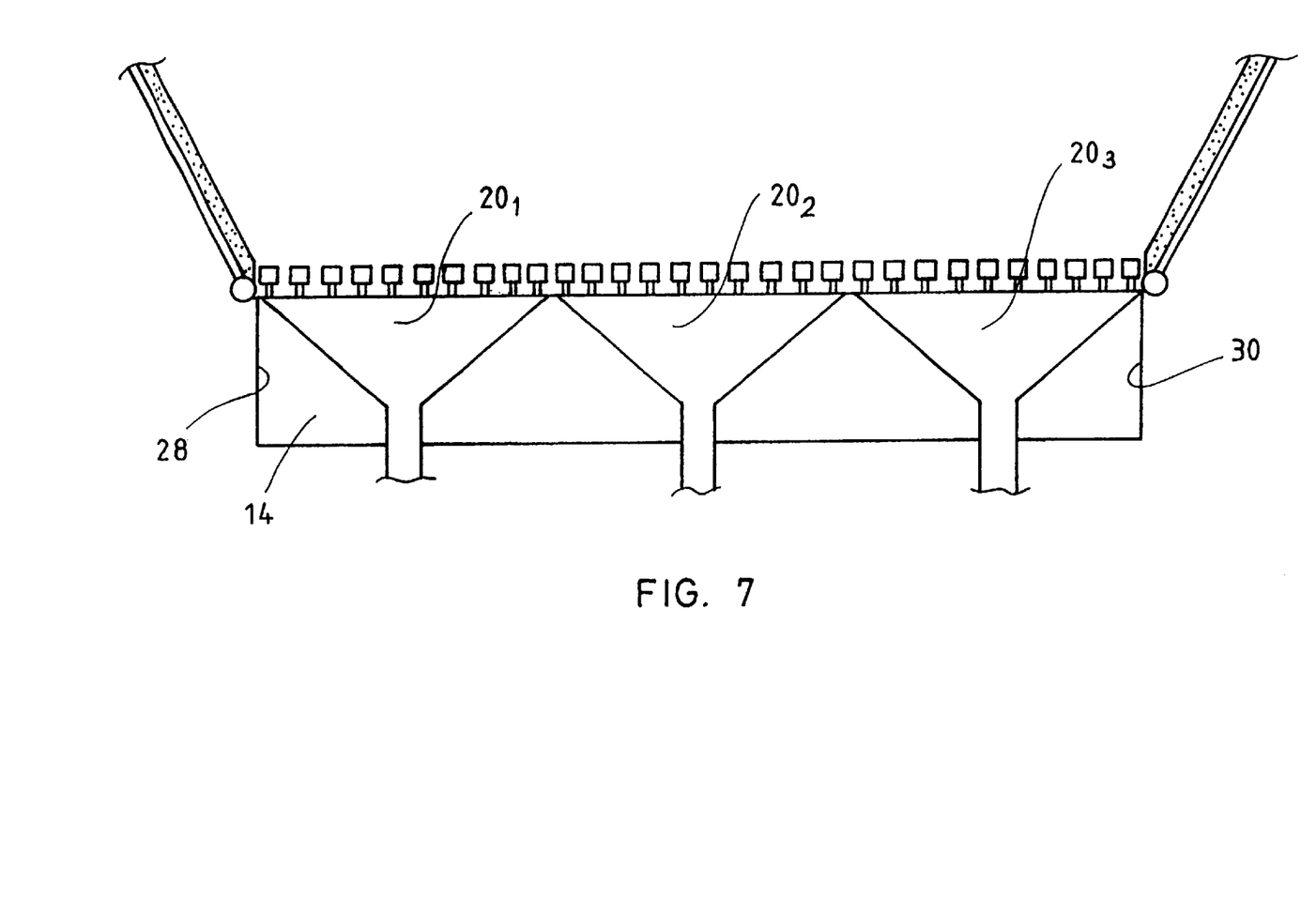
FIG. 7 illustrates, as in FIGS. 3 and 5, a vertical cross section of a third grate construction according to the invention mounted in the lower part of a furnace.

Similarly to FIGS. 3 and 5, FIG. 7 illustrates a third grate embodiment according to the invention wherein three consecutive pockets $20_1, 20_2, 20_3$ instead of one long pocket, have been mounted into a long windbox 14. Thus, the pockets can be less deep and/or more inclined than when installing only one pocket extending from wall 28 to wall 30 into the windbox. A sufficient number of such series of three or more pockets is provided in the grate sequentially in the depth direction as in FIG. 1. In the case of FIG. 7, the pockets are arranged in sequence in the same vertical plane, that is, at the same distance from the viewer. In large grates, in which several pockets are arranged also in the depth direction of the grate, the consecutive pockets of FIG. 7 may be arranged overlapping on different vertical planes, i.e., at different distances from the viewer.

Figure 8:
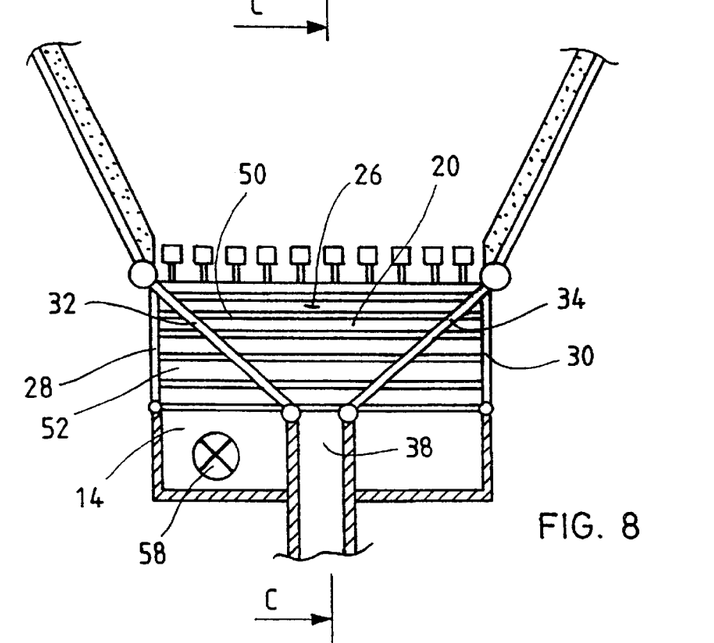
FIG. 8 illustrates a construction as in FIG. 3, in which the pocket of the invention is designed as a cooled construction.
Figure 9:
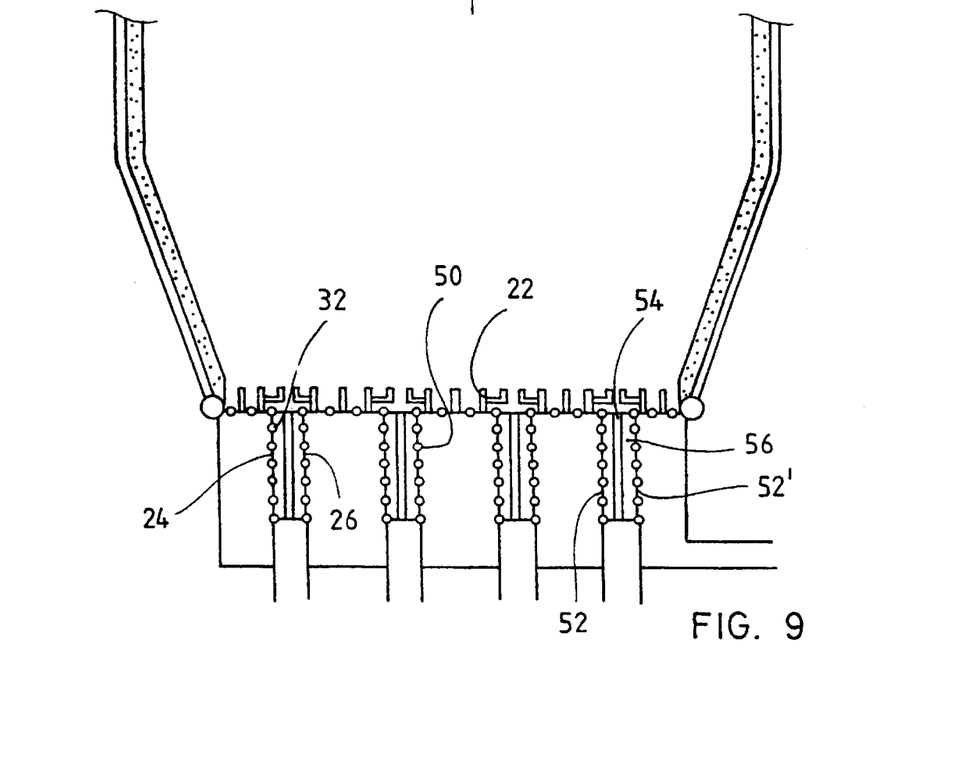
FIG. 9 illustrates a section along line CC in FIG. 8.

FIGS. 8 and 9 depict a grate construction according to FIGS. 3 and 1, in which the pocket 20 is made of cooling tubes 50. The long walls 24, 26 of the pocket are cooling panels 52 made of cooling tubes extending through the windbox. The transverse walls 32 and 34 are correspondingly made of cooling tubes 54 bent downwards from the upper part of the grate, which tubes are connected by means of, e.g., fins 56 to the long walls 24, 26. The pockets have the same form as the pockets of FIGS. 1–3. The cooling panel 52 is, however, preferably arranged to extend over its whole height from wall 28 to wall 30 whereby the panel can be connected to the cooling water circulation of the walls.

The intermediary parts of the pockets of the windbox may be connected to a common gas space below the cooling panels. The lower parts of the pockets are connected to outlet pipes 38 which, in the depicted case, are refractory lined and made of a heat resistant material but can be made of cooled constructions when so desired.

Under the grate, in the windbox 14, there may be, as is apparent from FIG. 8, a duct burner 58 by which the furnace and the bed material therein are heated when starting. The duct burner occupies a relatively large space preferably provided with refractory lined walls enduring high temperatures. The duct burners cannot be adapted in inlet pipes of conventional beam grates, in which the heating of the furnace must be arranged some other way.

In the aforementioned Figures, the pockets 20 start immediately from the walls of the furnace. A fringe portion of the same width or even broader than the grate zones can be left at the periphery of the grate, between the furnace walls and the pockets, from which fringe portion the coarse bed material is adapted to flow into the nearest pocket.

The long walls corresponding to the walls 24 and 26 of the aforementioned Figures may, when so desired, be of two separate water tube panel parts (not shown), which as to their water tube construction can be connected to different walls, like the opposite walls 28 and 30. The ends of the water tube panel parts projecting into the windbox may, in connection with the constructing of the furnace, be attached to each other to provide one single uniform wall in the windbox. The mounting of two separate panels projecting into the windbox from different walls is often easier than mounting one long wall into the same space.

Figure 10:
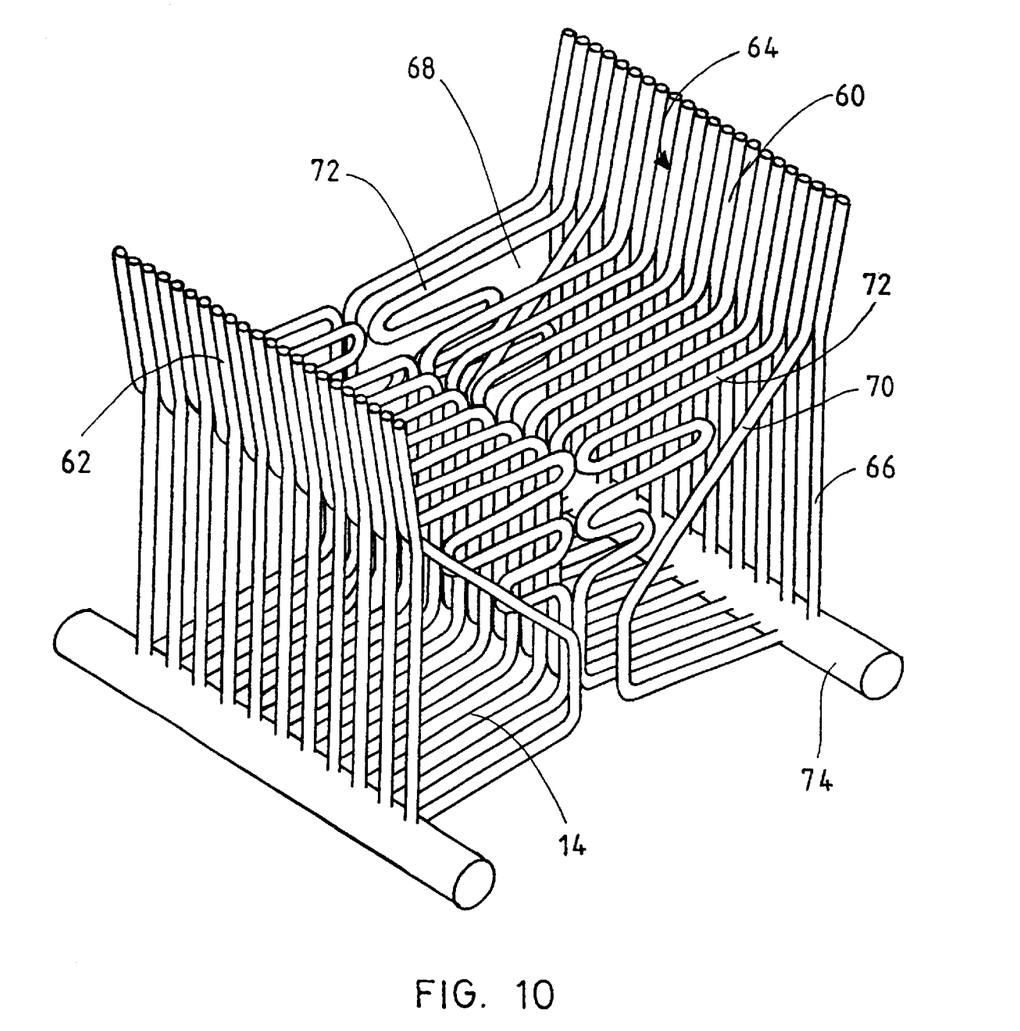
FIG. 10 axonometrically exemplifies a water tube construction according to the invention seen from above.
Figure 11:
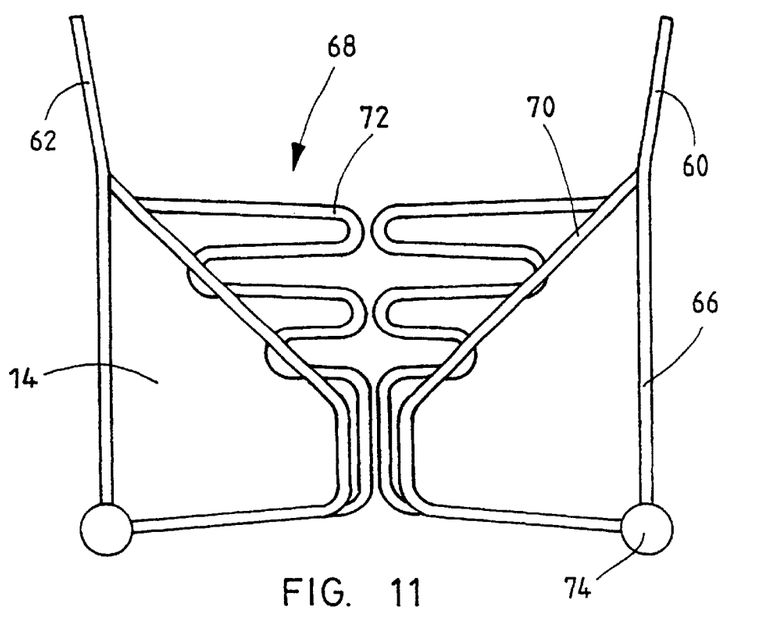
FIG. 11 illustrates the water tube construction of FIG. 10 as a front view in accordance with FIGS. 3 and 8.
Figure 12:
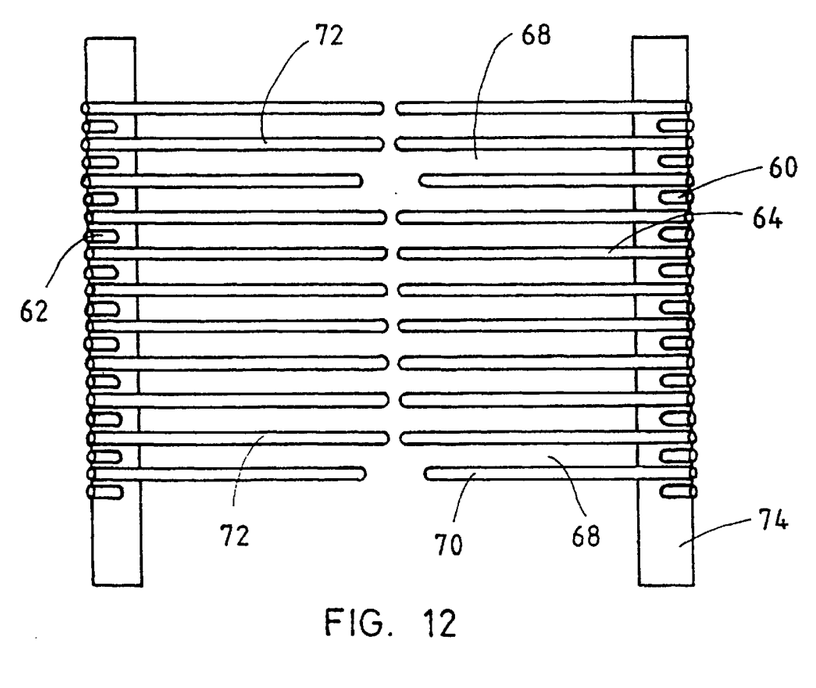
FIG. 12 illustrates the water tube construction of FIG. 10 viewed from above.

FIGS. 10–12 illustrate a water tube construction of a typical grate and windbox of the invention. In this case the grate is made of water tubes 64 bent from the two opposite walls 60, 62 of the furnace horizontally towards the center of the furnace. Adjacent water tubes are connected by fins to form gas tight walls, although not shown in these Figures. The horizontal water tubes of the grate extend to the central part of the furnace, wherefrom they are bent so as to run essentially vertically downwards to the bottom of the windbox 14, from which the water tubes are bent to run horizontally back towards the furnace walls. Thus, the bent water tubes form together with the unbent water tubes 66 of the furnace a space for the windbox rectangular in its vertical cross section.

In the embodiment of FIGS. 10–12, the grate has two hopper-like pockets 68 in the form of narrow slits. The inclined walls of the pockets are made of a water tube 70 bent from the furnace wall obliquely downwards towards the central portion of the furnace. The pocket walls transverse to the furnace walls 60, 62 are made of a water tube 72 bent into the horizontal from both walls 60, 62 towards the central portion of the furnace, which water tube is, in the central portion of the furnace, bent 180° downwards and to run horizontally a distance back towards said wall. After that, the water tube is again bent downwards 180° and to run horizontally back towards the center of the furnace. Thus, the hopper-like walls of the pockets are of water tubes adapted to run from both furnace walls, firstly towards the central portion of the furnace and then downwards for shorter and shorter distances between the central portion of the furnace and the inclined side of the pocket. The water tubes forming the grate and the pockets 64, 70 and 72 join to manifolds 74 on the sides of the windbox.

It is evident from FIG. 10 how water tubes extending from two opposite walls can be joined to form a grate extending over the entire cross section of the furnace or a pocket extending from one furnace wall to the other.

The invention is not delimited to the above embodiments but is largely applicable within the scope defined by the following claims. Thus, e.g., the pockets may be of a form other than hoppers. The transverse walls of the pockets may, for example, both be partially vertical or one vertical and the other inclined. Even the longitudinal walls may, if needed, be somewhat slanted.

A variety of nozzles may be used in the grate construction of the invention for distributing fluidizing air, as nozzle backflow does not present any serious problems.

What is claimed is:

1. A grate construction for a fluidized bed boiler, the boiler comprising a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate construction, the grate construction comprising:

means for distributing fluidizing air or other equivalent gas from the windbox into the furnace; and means for removing coarse solids from the grate construction, the means for removing coarse solids comprising a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering inwardly.

2. The grate construction of claim 1, wherein the pockets are parallel in the grate and at a distance from each other so that the pockets divide the grate into zones or sections.

3. The grate construction of claim 1, wherein the pockets divide the grate into longitudinal zones or sections.

4. The grate construction of claim 1, wherein the pockets comprise two essentially parallel, vertical, long walls placed at a distance from each other, and at least one transverse, inclined wall connecting the long walls.

5. The grate construction of claim 4, wherein two longitudinal walls are mutually connected by two inclined, transverse walls to form a pocket between the longitudinal walls so that the vertical cross section of the pocket parallel with the slit tapers downwards in the shape of a hopper.

6. The grate construction of claim 5, wherein the long walls of the pockets are formed of a cooled panel extending substantially from a first wall to an opposite second wall of the windbox, that the first transverse wall of the pocket extends essentially from the upper part of the first wall of the windbox slantingly downwards towards the central part of the windbox, and that the second transverse wall of the pocket extends essentially from the upper part of the second wall of the windbox slantingly downwards towards the central part of the windbox.

7. The grate construction of claim 6, further comprising two pockets in the windbox between the first and second cooled panels so that there is, between the panels, in addition to the first and second transverse walls, a third transverse wall extending slantingly downwards from the grate and forming with the first transverse wall a hopper-like downwards tapering pocket, and a fourth transverse wall, which together with the second transverse wall forms a hopper-like downwards tapering pocket.

8. The grate construction of claim 4, wherein the long walls of the pockets are mainly formed of cooled panels extending from the first wall of the windbox to the second, opposite wall and that at least two pockets are formed between a first and a second cooled panel in such a way that, in order to form a pocket, two transverse walls are arranged between the panels, the walls extending slantingly downwards within a distance from each other from the grate towards each other.

9. The grate construction of claim 4, wherein the vertical cross section of the pockets, in the plane of the long walls, is substantially in the form of a right-angled triangle so that one side of the triangle is parallel with the grate and another side is substantially perpendicular to the grate.

10. The grate construction of claim 1, wherein the vertical walls of the pockets and the transverse walls are made of cooling tubes.

11. The grate construction of claim 1, wherein the pockets comprise two vertical, long walls and one transverse, inclined wall forming one side of the pockets and the other side of the pockets is open and opens into an outlet duct for solids transverse to the pockets of the windbox.

12. The grate construction of claim 1, wherein the pockets divide the upper part of the windbox into longitudinal zones, which at their lower part communicate with an undivided part of the windbox.

13. The grate construction of claim 1, wherein the pockets divide the upper part of the windbox into longitudinal, primary grate zones substantially of the same length as the pockets and with a width $l_a$ greater than a width $l_t$ of the pockets, and that the width $l_a$ of the grate zones is greater than or equal to 20 cm and the pocket width $l_t$ is greater than or equal to 10 cm.

14. The grate construction of claim 13, wherein the width $l_a$ is between $(2 \text{ to } 10) \times l_t$.

15. The grate construction of claim 1, wherein the grate comprises a planar, substantially horizontal cooling plane of cooling tubes, and that at least a part of the pockets comprise cooling tubes bent into the windbox downwards from the cooling plane.

16. The grate construction of claim 1, wherein the pocket openings cover less than fifty percent of the grate cross-sectional area, and that the length of the horizontal cross-sectional area of the pockets at the grate level is at least twice the width of the cross-sectional area.

17. The grate construction of claim 1, wherein the pockets have a bottom which is at least partly inclined, an angle α of inclination being at least 15°.

18. The grate construction of claim 1, wherein the coarse solids removed from the grate comprise at least one of fluidized bed material and coarse ash.

19. A grate construction for a fluidized bed boiler, the boiler comprising a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate, the grate construction comprising:

means for distributing fluidizing air or other equivalent gas from the windbox into the furnace; and means for removing coarse solids from the grate construction, the means for removing coarse solids comprising a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering, wherein the pockets comprise two essentially parallel, vertical, long walls placed at a distance from each other, and at least one transverse, inclined wall connecting the long walls.

20. The grate construction of claim 19, wherein the long walls of the pockets are mainly formed of cooled panels extending from the first wall of the windbox to the second, opposite wall and that at least two pockets are formed between a first and a second cooled panel in such a way that, in order to form a pocket, two transverse walls are arranged between the panels, the walls extending slantingly downwards within a distance from each other from the grate towards each other.

21. The grate construction of claim 19, wherein the vertical cross section of the pockets, in the plane of the long walls, is substantially in the form of a right-angled triangle so that one side of the triangle is parallel with the grate and another side substantially perpendicular to the grate.

22. The grate construction of claim 19, wherein two longitudinal walls are mutually connected by two inclined, transverse walls to form a pocket between the longitudinal walls so that the vertical cross section of the pocket parallel with the slit tapers downwards in the shape of a hopper.

23. The grate construction of claim 22, wherein the long walls of the pockets are formed of a cooled panel extending substantially from a first wall to an opposite second wall of the windbox, that the first transverse wall of the pocket extends essentially from the upper part of the first wall of the windbox slantingly downwards towards the central part of the windbox, and that the second transverse wall of the pocket extends essentially from the upper part of the second wall of the windbox slantingly downwards towards the central part of the windbox.

24. The grate construction of claim 23, further comprising two pockets in the windbox between the first and second cooled panels so that there is, between the panels, in addition to the first and second transverse walls, a third transverse wall extending slantingly downwards from the grate and forming with the first transverse wall a hopper-like downwards tapering pocket, and a fourth transverse wall, which together with the second transverse wall forms a hopper-like downwards tapering pocket.

25. A grate construction for a fluidized bed boiler, the boiler comprising a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate, the grate construction comprising:

means for distributing fluidizing air or other equivalent gas from the windbox into the furnace; and means for removing coarse solids from the grate construction, the means for removing coarse solids comprising a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering, wherein the pockets comprise two vertical, long walls and one transverse, inclined wall forming one side of the pockets and the other side of the pockets is open and opens into an outlet duct for solids transverse to the pockets of the windbox.

26. A grate construction for a fluidized bed boiler, the boiler comprising a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate, the grate construction comprising:

means for distributing fluidizing air or other equivalent gas from the windbox into the furnace; and means for removing coarse solids from the grate construction, the means for removing coarse solids comprising a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering, wherein the pockets divide the upper part of the windbox into longitudinal, primary grate zones substantially of the same length as the pockets and with a width $l_a$ greater than a width $l_t$ of the pockets, and that the width $l_a$ of the grate zones is greater than or equal to 20 cm and the pocket width $l_t$ is greater than or equal to 10 cm.

27. A grate construction for a fluidized bed boiler, the boiler comprising a furnace defined by substantially vertical walls in which a fluidized bed of solid particles is maintained, a windbox under the furnace in the lower part of the boiler, a grate construction being positioned between the furnace and the windbox and forming an upper surface of the windbox, for suspending the fluidized bed in the furnace and an outlet duct for withdrawing from the boiler solid material removed from the grate, the grate construction comprising:

means for distributing fluidizing air or other equivalent gas from the windbox into the furnace; and means for removing coarse solids from the grate construction, the means for removing coarse solids comprising a plurality of essentially vertical pockets projecting from the grate construction into the windbox and opening into the furnace, the horizontal cross section of the pockets at the grate level being formed as a longitudinal slit and the vertical cross section parallel to the longitudinal direction of the slits being downwards tapering, wherein the pockets divide the upper part of the windbox into longitudinal, primary grate zones substantially of the same length as the pockets and with a width $l_a$ greater than a width $l_t$ of the pockets, and that the width $l_a$ of the grate zones is greater than or equal to 20 cm and the pocket width $l_t$ is greater than or equal to 10 cm, the width $l_a$ being between $(2 \text{ to } 10) \times l_t$.

\* \* \* \* \*